US006301796B1

(12) United States Patent
Cresson

(10) Patent No.: US 6,301,796 B1
(45) Date of Patent: *Oct. 16, 2001

(54) PROGRAMMABLE PROBE SYSTEM

(75) Inventor: Serge Cresson, Gagny (FR)

(73) Assignee: Renishaw PLC, Gloucestershire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,407

(22) Filed: Apr. 6, 1998

(30) Foreign Application Priority Data

Apr. 14, 1997 (FR) .................................................. 97 04791

(51) Int. Cl.[7] .............................. G01B 5/008; G01B 5/00
(52) U.S. Cl. ................................ 33/556; 33/558; 702/168
(58) Field of Search .............................. 33/556, 558, 559, 33/561, 503, 504, 505; 702/167, 168, 188, 150, 151, 152, 153; 340/825.23

(56) References Cited

U.S. PATENT DOCUMENTS

| 4,608,714 | 8/1986 | Juengel . | |
|---|---|---|---|
| 5,150,529 | 9/1992 | Collingwood . | |
| 5,418,730 | * | 5/1995 | Mariani et al. ...................... 700/180 |
| 5,671,158 | * | 9/1997 | Fournier et al. ......................... 345/8 |
| 5,949,352 | * | 9/1999 | Ferrari ............................. 340/870.16 |

FOREIGN PATENT DOCUMENTS

| 0 268689 | 6/1988 | (EP) . |
|---|---|---|
| 0 337 671 A2 | 10/1989 | (EP) . |
| 0 428322 A1 | 5/1991 | (EP) . |
| WO 95/28615 | 10/1995 | (WO) . |
| WO 96/36028 | 11/1996 | (WO) . |

* cited by examiner

*Primary Examiner*—Diego Gutierrez
*Assistant Examiner*—R. Alexander Smith
(74) *Attorney, Agent, or Firm*—Oliff & Berridge, PLC

(57) ABSTRACT

A programmable probe system for a machine includes a probe, an interface and a two-way optical communication link between them. The probe includes signal conditioning electronics, a power supply, a plurality of on/off switch circuits whereby the electronics may be connected to, and disconnected from, the power supply by a variety of means, for example, an optical signal, or a mechanical switch and a timing circuit. The probe also includes a microprocessor which can be externally programmed from the interface to select one or other of the on/off switch circuits. Where the probe includes a radio transmission for transmitting probe data to the interface, it is also provided with a synthesiser for generating different operating frequencies for the transmission system. The microprocessor can also be programmed from the interface to change the frequency of the system where required.

13 Claims, 2 Drawing Sheets

PROGRAMMABLE PROBE SYSTEM

The present invention relates to programmable probe systems.

Probes fall into two main categories known as analogue or touch trigger probes. In almost all cases, probes include electronic systems for conditioning the signals generated by the probe prior to these signals being passed to an interface on a machine.

The probe signals may be passed to the machine through a hard wired communication link, which is fairly normal practice on coordinate measuring machines, or may include wireless transmission systems, for example infra-red or radio transmission systems, which is more common on machine tools.

The electronic systems used need to be powered, and in most instances power is provided from a battery in the probe itself. In order to preserve battery life the probe is switched off when not in use, and is only switched on when it is required to be used in a probing operation.

Various methods have been devised for switching on a probe when required for a probing operation. For example, the probe may include a centrifugal switch which is actuated by spinning the probe above a certain speed, and actuation of this switch connects the probe circuits to the battery. Other methods of switching on the probe include a mechanical switch in the shank of the probe which is operated as soon as the probe is inserted into the machine spindle, and an optical system in which an infra-red signal sent from a remote position on the machine is received by an optical receiver on the probe which makes the connection to the power supply.

In addition there are also a variety of methods of switching the probe off, or back into a standby mode, after a probing operation has been completed. The methods include the use of a centrifugal switch, an optical signal from the machine, or using a timing circuit within the probe to switch off the probe if no probing operation has taken place for a specified interval.

In the past any given probe has been provided with one method of switching on and off, and depending on the type of machine in which the probe is to be used, the user has had to select a particular type of probe to suit his machine requirements.

This has led to a proliferation of probe types, with the probe manufacturer having to stock a variety of probe types in order to satisfy different customer demands.

More recently, steps have been taken to attempt to minimize the number of different probes which it is required to stock by providing a probe in which more than one method may be used for switching the probe on or off, and the operator has the choice by manually operating a switch to select which type of operation is suitable for his machine.

It is an object of the present invention to provide a programmable probe system in which the probe is provided with a plurality of switch-on mechanisms along with associated switch circuits, and in which the probe may be programmed externally to select one of the switch circuits, whereby different ones of the switch-on mechanisms may be activated.

The concept of the invention may however be extended beyond simply programming the method by which the probe power is switched on and off. Thus the probe may be provided with other optional features which can be selected by programming the probe from outside.

For example, one particular form of transmission which is used by probes is a radio transmission. In order to accord with various national laws, the bandwidths of the transmission frequencies for use with radio probes are quite limited. Also, because of the range of the radio transmissions, there is a danger of interference by the probe with other electronic apparatus used by machine or even other probes on nearby machines. For this reason the available bandwidths are divided into relatively narrow channels and each probe is arranged to transmit only on one of the narrow channels. In the past, the frequency of the narrow channel has been set during manufacture of the probe, and in order to provide a plurality of probes with different frequencies of transmission this has required a stock of probes being maintained so that a choice of channel is available to the customer.

Another object of the invention is to provide a programmable probe system in which the probe is able to operate on one of a plurality of externally programmable radio channel frequencies.

These objects and others are achieved in a programmable probe system in accordance with the invention as stated below and as claimed in the appended claims.

According to the present invention a programmable probe system for a machine comprises a probe, an interface and a wireless communication link therebetween, wherein:

the probe includes a plurality of optional features which are selectable by external programming, and a microprocessor which is programmable to select any of the optional features;

the interface is mountable on the machine and includes a microprocessor which is programmable by an operator to determine which of the optional features in the probe is to be selected; and the wireless communication link includes a transmitter on the interface for sending to the probe a signal which comprises program instructions for the microprocessor in the probe relating to the selection of optional features to be made, and a receiver on the probe for receiving said signal to enable the microprocessor in the probe to make said selection of one of the optional features.

In one embodiment of the invention the selectable optional features are switch circuits by means of which the probe electronics may be connected to, and disconnected from, the power supply in the probe.

In another embodiment of the invention the selectable optional features are frequency channels for a radio transmission system of the probe.

Examples of the invention will now be more particularly described with reference to the accompanying drawings in which.

Figure 1:
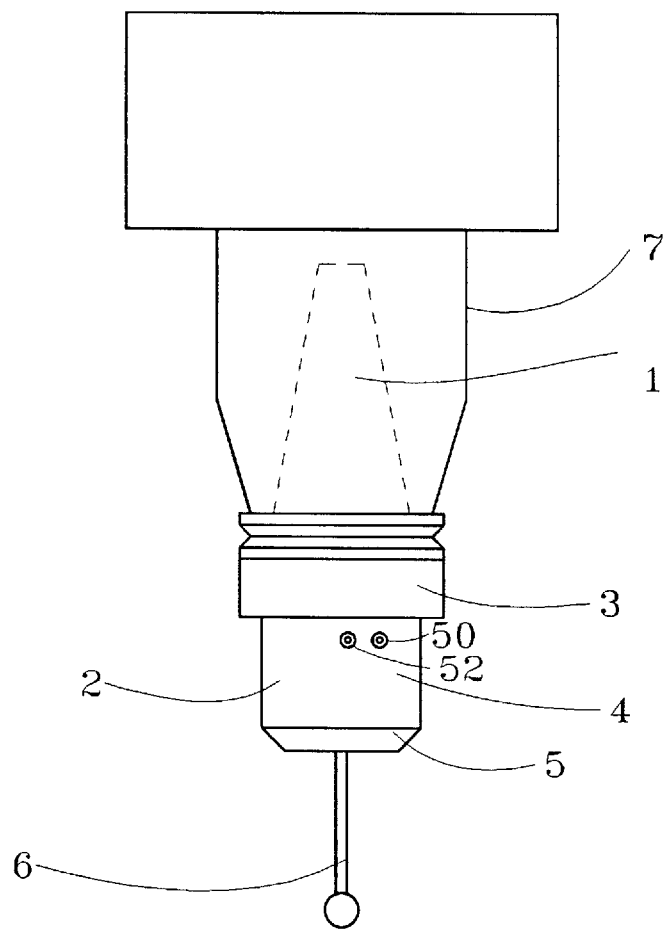
FIG. 1 shows a probe incorporating the invention.

Referring now to FIG. 1, there is shown a probe 2 which may be a conventional touch trigger or analogue probe and which has a shank 1 for attachment to a machine tool spindle 7.

The probe has a housing within different sections of which are contained a radio transmission system 3, the signal conditioning electronics 4 and a mechanical suspension system 5 for a stylus 6 which projects outwardly from the bottom of the housing.

The radio transmission system communicates probe data relating to a measuring operation from the probe to an interface 10 mounted on the machine (not shown).

Figure 3:
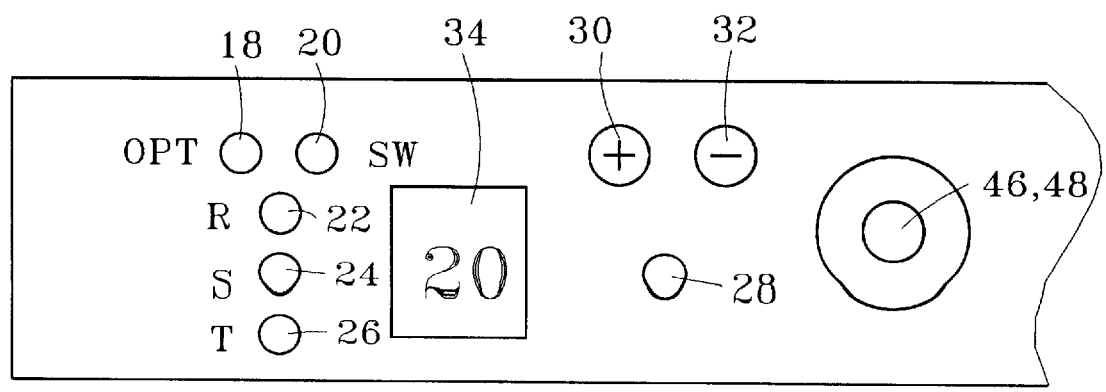
FIG. 3 shows the layout of the front panel of the interface.
Figure 2:
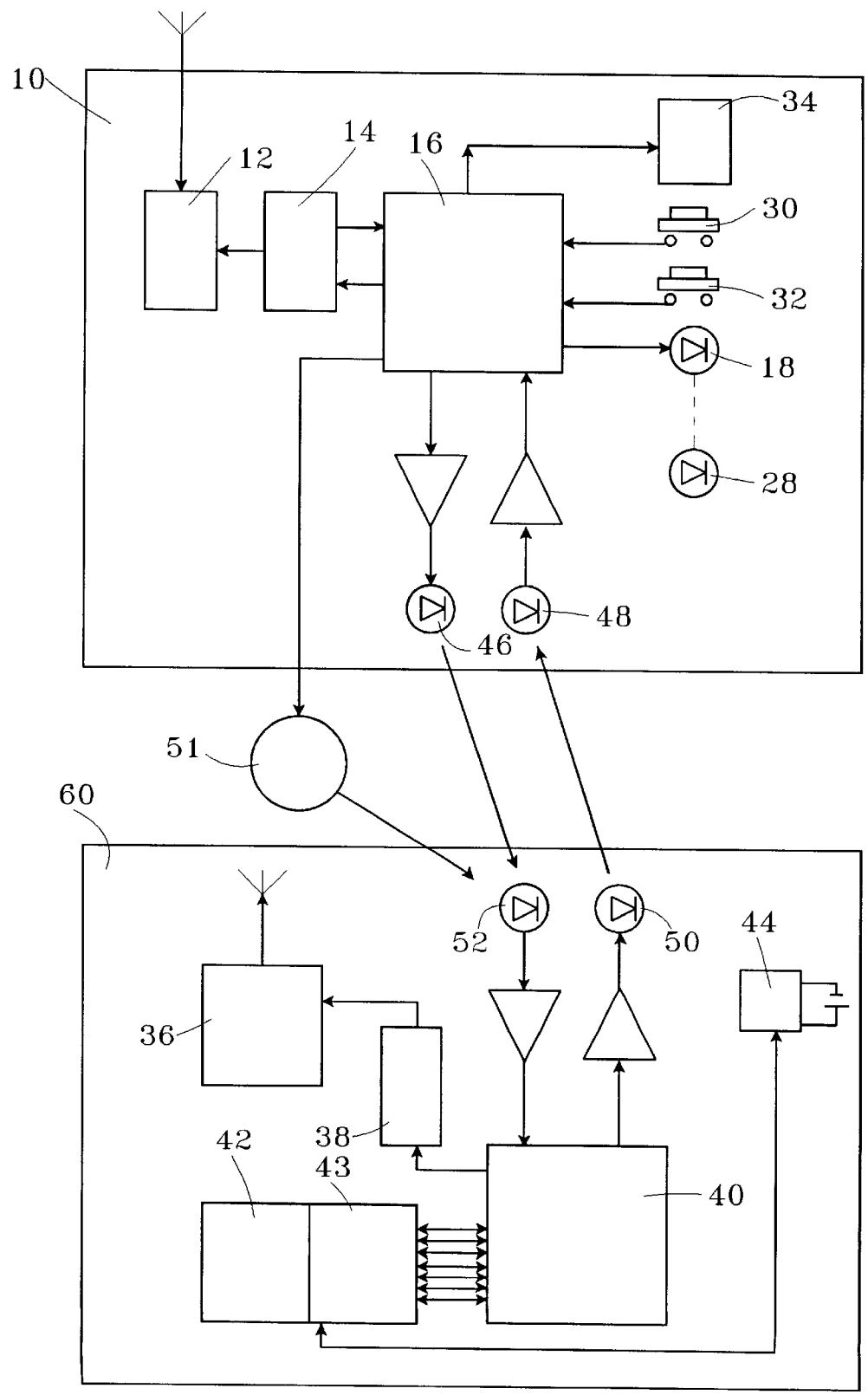
FIG. 2 is a diagrammatic representation of the circuits in the probe and the interface.

Referring now to FIGS. 2 and 3, the circuit in the interface 10 includes a radio receiving circuit 12, a synthesizer 14, which generates the frequencies for use in the radio circuit, and a microprocessor 16 which is conveniently of the type known as the PIC series made by Arizona Microchip Corporation of the United States of America. The microprocessor includes a memory section in the form of an EEPROM (electrically erasable programmable read only memory). Also in the interface are six status LEDs 18, 20, 22, 24, 26 and 28, two push button selector switches 30, 32 and a channel indicator 34.

The circuit 60 in the probe includes a radio transmission circuit 36, a synthesizer 38 for generating the frequencies to be used in the radio circuit, and a further PIC microprocessor 40 with an associated EEPROM.

In addition, shown diagrammatically, there are the probe electronics 42, which include the conditioning electronics 4 which condition the probe signal for transmission to the interface 10 over the radio transmission system, and the different switch circuits 43, for connecting and disconnecting the probe electronics with a power supply 44. Although indicated as being separate, clearly many of the functions of the probe electronics and switch circuits may be incorporated into the microprocessor 40.

The two microprocessors 16, 40 are connected by a wireless two-way communication link, which may be of relatively short range comprising, for example, transmitting and receiving photodiodes 46, 48 provided near the exterior of the interface, and transmitting and receiving photodiodes 50, 52 provided on the probe.

The microprocessor 16 in the interface performs the following functions:

a) it programmes the channel frequency of the synthesizer 14, loading it with the appropriate values stored in its EEPROM;

b) it monitors the status LEDs 18–28, the two push button selector switches 30, 32, and the channel indicator 34, allowing the operator to select the required channel frequency and start-up mode for the probe;

c) it controls the operation of the transmitting and receiving photodiodes 46, 48, and some audio signals for the operator as described below. The microprocessor continuously monitors the status of the optical receiver 48, and when it recognizes that a signal is coming in from the probe, it initiates a dialogue to display the probe status (channel and start-up mode) on a display panel, and sets the timer to provide the audio signals.

The microprocessor 40 in the probe performs the following functions:

a) it programmes the frequency of the synthesizer upon receipt of a signal from the interface, and generates the timing and sequencing of the radio transmission of the probe;

b) it controls the operation of the transmitting and receiving photodiodes 50, 52. A watchdog circuit activates the microprocessor if it detects a start condition of the probe, or if the battery is changed. In this case the microprocessor activates its programming protocol which consists of sending a signal to the interface through the optical transmitter, but if no reply is received within a given time period the activity is aborted.

The system is operated as follows: Prior to inserting the probe into the machine, the status of the on/off switching and the frequency channel of the radio transmission system can be checked by bringing the probe into the range of the two-way communication link between the probe and the interface. Once the communication link is established the probe transmits to the interface the status of its programmed functions, that is the frequency channel which it has been programmed to operate on, and the modes by which the probe will be switched on and off.

The receiver on the interface is programmed to receive probe information over a predetermined interval, for example 5 seconds, during which time it emits a regular beep in order to indicate that it is in receiving mode.

The microprocessor in the interface causes the probe program information to be displayed by indicating the channel number on the channel display, and by lighting up the appropriate sequence of status LEDs on the switching display. If the actual probe programming coincides with the desired probe programming, the probe is then removed from the interface and can be inserted into the machine for use.

If the programmed information in the probe is incorrect, the operator is able to program the interface with a set of instructions to be passed to the probe in order to change the probe's programming. The channel is reprogrammed by pressing one or other of the two selector buttons, one of which will increase the channel number and the other one of which will decrease the channel number until the correct channel is shown in the channel display window. Up to 70 different channels can be selected in this manner.

In order to change the on/off switching mode, the two buttons are pressed simultaneously and each time they are pressed a different switching mode will be shown by illumination of two of the status LEDs. As can be seen from FIG. 3, the operator can choose between an optical switch-on method, which is indicated by lighting up the OPT LED, or a mechanical switching method which is indicated by lighting up the SW LED. In combination with either of these methods, there are three further choices indicated by modes R,T and S. When these LEDs are lit they indicate whether the switching method will be centrifugal, represented by R, by timing, represented by T, or by a mechanical switch represented by S.

Thus, we have for example, five on/off switching modes as follows.

1. When both the SW and R LEDs are lit, this indicates that the probe will be switched on and off by spinning the probe in the machine to actuate a centrifugal switch.

2. When the SW and T LEDs are lit, this indicates that the probe will be switched on by the centrifugal switch but will be switched off after a time interval from the end of the last probing operation.

3. When the S LED is lit, this indicates that the probe will be switched on by a mechanical switch in the shank, which will be automatically operated when the probe is inserted into the machine, and once again will be automatically operated to switch the probe off when the shank is removed from the machine.

4. When the OPT and R LEDs are lit, this indicates that the probe will be switched on and off by optical signals from a machine mounted transmitter 51.

5. When the OPT and T LEDs are lit, this indicates that the probe will be switched on by an optical signal from the machine but will be switched off after a certain time interval has elapsed since the last probing operation.

Once the operator has set the required programmes into the memory of the microprocessor, the probe can be brought back in front of the interface to within transmission range of the infra-red transmission system. During the first 5 seconds the interface will show the programming which is set into the probe, but if the probe is maintained in this position for another 5 seconds while a continuous beep is emitted by the interface, this indicates that programming of the probe by the interface is imminent. After this 5 second interval, communication between the probe and the interface is reversed and the interface now sends programming information across the infra-red transmission link to the microprocessor in the probe.

The microprocessor in the probe then actuates the synthesiser to change the frequency of the radio transmission circuit, and activates the appropriate on/off switching circuit. The newly programmed information is also stored in the EEPROM of the microprocessor in the probe.

During the programming routine, the programming status LED is lit and the probe emits a rapid double beep to inform the operator that programming is taking place. At the end of the programming sequence the new status information is shown by illumination of the status LEDs and the new channel programmed into the probe is shown in the panel indicator window.

If programming for some reason is not completed the interface will emit a permanent beep and the programming LED will switch out. The operator then has an opportunity to start the programming sequence all over again.

It can be seen that by means of the invention it is possible to provide a single probe programmable with up to 70 different radio channels and with 5 different on/off switching modes. This dramatically cuts down the variety of probes which have to be made available to customers, and gives the customer the flexibility of programming one probe to suit the circumstances.

What is claimed is:

1. A programmable probe system for a machine comprising a probe, an interface and a wireless communication link therebetween, wherein:
   the probe has a plurality of modes of operation, each of which has a plurality of selectable states which are selectable by external programming, and includes a microprocessor which is programmed to select any one of said selectable states of any one of the plurality of modes of operation of the probe;
   the interface is mountable on the machine and includes a microprocessor which is externally programmable and determines for each one of said modes of operation of the probe which one of said selectable states is to be selected; and
   the wireless communication link includes a transmitter on the interface for sending to the probe a signal which comprises program instructions for the microprocessor in the probe to make the selection of said one of the selectable states of at least one of the modes of operation of the probe as determined by the operator, and a receiver on the probe for receiving said signal to enable the microprocessor in the probe to make said selection.

2. A programmable probe system according to claim 1, the probe including a power supply and probe electronics for generating probe data to be sent to the machine, and wherein one of the modes of operation of the probe is an on and off mode in which the probe is switched on and off, and the selectable states of said on and off mode of operation are the means whereby which the probe electronics may be disconnected from, and connected to, the power supply and include switch circuits in the probe.

3. A programmable probe system according to claim 1 wherein one of the modes of operation of the probe is a linking mode using a further wireless communication link between the probe and the interface by means of which probe data signals are transmitted from the probe to the interface, and the selectable states of said linking mode of operation of the probe are the parameters of the further wireless communication link.

4. A programmable probe according to claim 3 wherein the further wireless communication link is a radio transmission system which comprises a radio transmitter in the probe and a radio receiver in the interface, and the selectable states of said linking mode are a plurality of channel frequencies of pre-selected bandwidths for transmitting said probe data signals to the interface.

5. A programmable probe system according to claim 4, wherein frequency synthesizers are provided in the probe and interface for changing the frequency of the probe data signals between the pre-selected bandwidths, wherein the microprocessor in the interface stores channel data and is programmable by the operator to select a channel frequency to activate the synthesizer in the interface to tune the radio receiver to the selected channel frequency and, when required, to communicate the selected channel frequency to the probe across said further wireless communication link, and further wherein the microprocessor in the probe is programmed to receive channel frequency selection information from the interface and to activate the synthesizer in the probe to tune the radio transmitter in the probe to the selected channel frequency.

6. A programmable probe system according to claim 1, wherein the wireless communication link further comprises a transmitter on the probe and a receiver on the interface by means of which information relating to status of switch circuits in the probe is communicated to the interface.

7. A programmable probe system according to claim 1, wherein the wireless communication link comprises at least one optical transmitter and receiver.

8. A programmable probe system for a machine including:
   a probe having a power supply and probe electronics for generating probe output data, the probe having a plurality of modes of operation each of which has a plurality of selectable states,
   a machine interface;
   wherein one of the modes of operation of the probe comprises a first wireless communication link between the probe and the interface for sending the probe output data to the interface, said communication link having a plurality of selectable states, and further wherein a second wireless communication link is provided between the probe and the interface for sending signals between the interface and the probe for selecting which of the selectable states of the first communication link is to be used.

9. A programmable probe system according to claim 8 wherein the first communication link is a radio transmission system and the selectable states of the radio transmission system are channel frequencies of pre-selected bandwidths for transmitting the probe data signals to the interface.

10. A programmable probe system according to claim 9 wherein the radio transmission system comprises a transmitter on the probe and a receiver on the interface.

11. A programmable probe system according to claim 8 wherein the second wireless communication link comprises an optical transmission system.

12. A programmable probe system according to claim 11 wherein the optical transmission system comprises a transmitter on the interface and a receiver on the probe by means of which a selected one of the selectable states of the first communication link is communicated to the probe.

13. A programmable probe system according to claim 11 wherein the optical transmission system further comprises a transmitter on the probe and a receiver on the interface by means of which a selected one of the selectable states currently programmed into the probe is communicated to the interface.

* * * * *